UNITED STATES PATENT OFFICE.

CHARLES E. HORE, OF BROOKLYN, NEW YORK.

PROCESS OF MAKING CHROME-RED.

SPECIFICATION forming part of Letters Patent No. 305,389, dated September 16, 1884.

Application filed January 15, 1884. (Specimens.)

*To all whom it may concern:*

Be it known that I, CHARLES E. HORE, a citizen of the United States, residing at Brooklyn, in the county of Kings and State of New York, have invented new and useful Improvements in the Manufacture of Chrome-Red, of which the following is a specification.

This invention relates to the manufacture of a chrome-red by the reaction of bichromate of potash upon sublimed lead in the presence of an alkali. Sublimed lead, or lead anhydrite, is a substance obtained from galena ores, and it is generally of the following composition:

| | |
|---|---:|
| Sulphate of lead | 65.93 |
| Sulphite of lead | 1.98 |
| Oxide of lead | 31.13 |
| Oxide of zinc | 0.96 |
| Total | 100.00 |

In carrying out my invention I take five hundred pounds of sublimed lead, place the same in a mixer containing a suitable agitator, and add thereto a solution of ninety pounds of bichromate of potash and thirty-eight pounds of crystallized soda-ash and boil and agitate until the reaction is completed, which can be ascertained when the liquor is clear and no bichromate is contained in the mother-liquor. The resulting coloring-matter is separated by drawing off the supernatant liquor, and it is then repeatedly washed and finally dried. It has a bright-red color. If a deeper or darker shade of red is desired, an additional ninety pounds of bichromate of potash and thirty-eight pounds of soda-ash are added; but in this case the liquor contains chromate of soda in excess.

Instead of soda-ash, any other equivalent alkaline substance may be used, such as potash or lime.

My chrome-red can be used in the same manner as chrome-red produced from white lead; but it can be distinguished from the same by the presence of zinc.

What I claim as new, and desire to secure by Letters Patent, is—

The process, substantially as hereinbefore described, for producing a chrome-red, said process consisting in mixing sublimed lead with a solution of bichromate of potash and an alkali, such as soda-ash, boiling the mixture, and finally separating the insoluble pigment from the soluble product, substantially in the manner set forth.

In testimony whereof I have hereunto set my hand and seal in the presence of two subscribing witnesses.

CHAS. E. HORE. [L. S.]

Witnesses:
W. HAUFF,
E. F. KASTENHUBER.